(12) United States Patent
Gupta et al.

(10) Patent No.: US 11,042,643 B2
(45) Date of Patent: Jun. 22, 2021

(54) TRUSTED DEPLOYMENT OF APPLICATION CONTAINERS IN CLOUD DATA CENTERS

(71) Applicants: Intel Corporation, Santa Clara, CA (US); Abhishek Gupta, Santa Clara, CA (US); Yeluri Raghuram, Sunnyvale, CA (US)

(72) Inventors: Abhishek Gupta, Santa Clara, CA (US); Yeluri Raghuram, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 92 days.

(21) Appl. No.: 15/778,272

(22) PCT Filed: Dec. 24, 2015

(86) PCT No.: PCT/US2015/000401
§ 371 (c)(1),
(2) Date: May 23, 2018

(87) PCT Pub. No.: WO2017/111843
PCT Pub. Date: Jun. 29, 2017

(65) Prior Publication Data
US 2018/0349610 A1 Dec. 6, 2018

(51) Int. Cl.
*G06F 21/57* (2013.01)
*G06F 21/51* (2013.01)
*G06F 9/50* (2006.01)

(52) U.S. Cl.
CPC .......... *G06F 21/575* (2013.01); *G06F 9/5077* (2013.01); *G06F 21/51* (2013.01);
(Continued)

(58) Field of Classification Search
None
See application file for complete search history.

(56) References Cited

U.S. PATENT DOCUMENTS 8,539,073 B1    9/2013    Dayan
8,924,720 B2    12/2014    Raghuram et al.
(Continued)

FOREIGN PATENT DOCUMENTS

CN    105069353    *    8/2015    ............ G06F 21/53
CN    105069353 A    11/2015
(Continued)

OTHER PUBLICATIONS

DevopsCube, "What is Docker? How Does it Work?" [online]. Dec. 2014 [retrieved on Nov. 18, 2019]. Retrieved from the Internet : URL: https://web.archive.org/web/20151217151956/https://devopscube.com/what-is-docker/ (Year: 2014).*
(Continued)

*Primary Examiner* — Taghi T Arani
*Assistant Examiner* — Joshua Raymond White
(74) *Attorney, Agent, or Firm* — Jordan IP Law, LLC (57) ABSTRACT

Systems, apparatuses and methods may provide for establishing a hardware-based chain of trust in a computing system and extending the hardware-based chain of trust to a container manager and a containerized application on the computing system. Additionally, the containerized application may be checked for its trust and security while it is launched, via the container manager, on the computing system. In one example, extending the hardware-based chain of trust includes conducting a pre-boot measurement of the container manager, a root of trust measurement agent, and one or more packages associated with the containerized application, and verifying the pre-boot measurement of the platform/host and the application itself prior to the containerized application being launched.

20 Claims, 8 Drawing Sheets

(52) U.S. Cl.
CPC ............ *G06F 21/57* (2013.01); *G06F 21/572* (2013.01); *G06F 21/577* (2013.01)

(56) References Cited

U.S. PATENT DOCUMENTS

| | | | |
|---|---|---|---|
| 2005/0086509 A1* | 4/2005 | Ranganathan | G06F 21/57 726/27 |
| 2007/0118769 A1 | 5/2007 | England et al. | |
| 2008/0228770 A1* | 9/2008 | Halcrow | G06F 16/119 |
| 2008/0250406 A1 | 10/2008 | Carpenter et al. | |
| 2010/0064299 A1 | 3/2010 | Kacin et al. | |
| 2014/0380031 A1 | 12/2014 | Jones et al. | |
| 2015/0237502 A1* | 8/2015 | Schmidt | H04W 12/0023 726/7 |
| 2017/0364685 A1* | 12/2017 | Shah | G06F 21/53 |

FOREIGN PATENT DOCUMENTS

| | | |
|---|---|---|
| JP | 2009534775 A | 9/2009 |
| KR | 20140105343 A | 9/2014 |

OTHER PUBLICATIONS

DevopsCube, "What is Docker? How Does it Work?" [online]. Dec. 2014 [retrieved on Nov. 18, 2019]. Retrieved from the Internet : URL: https://web.archive.org/web/20151217151956/https://devopscube. corn/what-is-docker/ (Year: 2014).*

International Preliminary Report on Patentability for International Patent Application No. PCT/US2015/000401, dated Jul. 5, 2018, 9 pages.
Office Action for Japanese Patent Application No. JP2016-234998, dated Jan. 15, 2018, 9 pages with 5 pages of English translation.
Raghu Yeluri et al., "Trusted Docker Containers and Trusted VMs in OpenStack", Mar. 26, 2015, 01.orgisites/default/files/openstacksummit_vancouver_trusteddockercontainers.pdf, 18 pages.
Masahito Zenbutsu, "Operating Docker Freely, Linux Container Technology which has been put into practical use", SoftwareDesign, Dec. 28, 2015, 11 pages.
Wataru Ishida et al., Implementation of World OS utilizing Virtualization Technology on Linux, Information Processing Society of Japan, Nov. 18, 2015, 13 pages.
International Search Report and Written Opinion for International Patent Application No. PCT/US2015/000401, datede Aug. 24, 2016, 14 pages.
"Docker trusted registry: Secure collaboration on your distributed applications", docker.com, 2015, 3 pages.
Kolyshkin, Kir, "Containers and namescapes in the Linux Kernel", The Linux Foundation Collaboration Summit, Apr. 14-16, 2010, 27 pages.
R. Yeluri et al., "Trusted Docker Containers and Trusted VMs in OpenStack", <01.org/sites/default/files/openstacksummit_vancouver_trusteddockercontainers.pdf>, Sep. 20, 2015, 16 pages.
Singapore Search Report and Written Opinion for Singapore Patent Application No. 10201609756T, mailed Oct. N, 2019, 8 pp.

* cited by examiner

TRUSTED DEPLOYMENT OF APPLICATION CONTAINERS IN CLOUD DATA CENTERS

CROSS REFERENCE TO RELATED APPLICATIONS

This application is a U.S. National Phase Patent Application which claims benefit to International Patent Application No. PCT/US2015/000401 filed on Dec. 24, 2015.

TECHNICAL FIELD

Embodiments generally relate to application containers. More particularly, embodiments relate to the trusted deployment of application containers in cloud data centers.

BACKGROUND

In cloud data centers, one or more software applications may be packaged, along with all of the dependencies of the application, into a container (e.g., a LINUX container) in order to provide an alternative/complement to virtual machines in cloud data centers. For example, recent container management efforts may lead to the ability to store images (e.g., application file snapshots) of the containerized application to private and/or public repositories, launch containers from existing images, and incrementally create and/or store new container images. Despite these developments, however, conventional container management solutions may be untrustworthy due to vulnerability of attack. Accordingly, container security in cloud data centers may remain a bottleneck (e.g., due to encryption/decryption-related performance penalties).

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
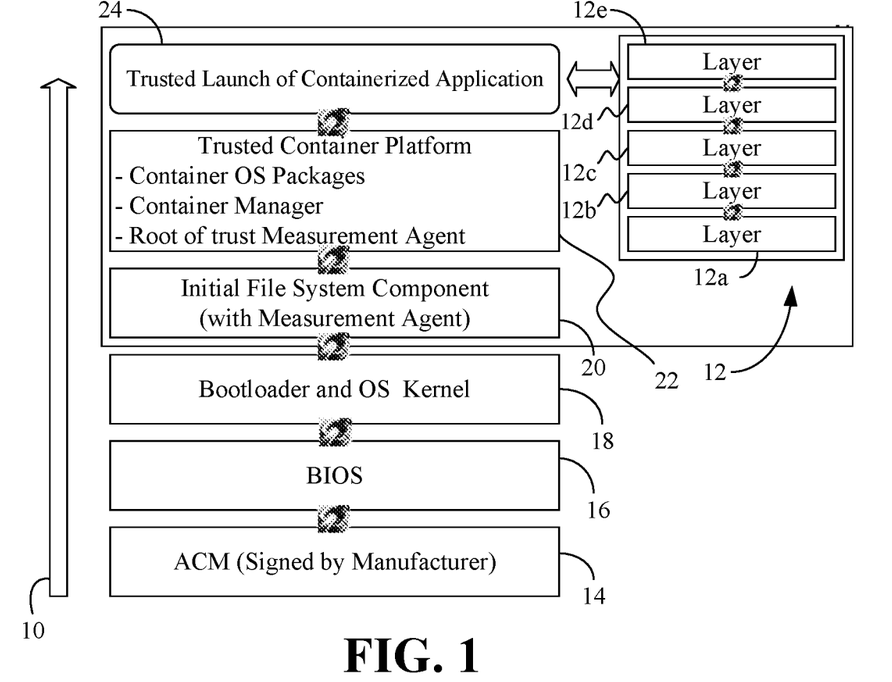
FIG. 1 is a block diagram of an example of a chain of trust according to an embodiment.

Turning now to FIG. 1, a chain of trust 10 is shown for a computing system (e.g., cloud data center) that supports the secure launching of containerized applications such as, for example, a containerized application 12 (e.g., LINUX container). As will be discussed in greater detail, the containerized application 12 may generally be structured as a plurality of layers 12a-12e, with each layer containing one or more application files. In the illustrated example, a hardware-based layer 14 includes an authenticated code module (ACM) that is digitally signed by a chipset manufacturer in accordance with a security framework such as, for example, the INTEL Trusted Execution Technology (TXT) framework. When the computing system powers on, hardware may validate the signature and integrity of the ACM prior to execution of the ACM. The ACM at the hardware-based layer 14 may then validate the integrity of a BIOS (basic input/output system) layer 16, which may in turn validate the integrity of a bootloader and operating system (OS) kernel layer 18.

As will be discussed in greater detail, the chain of trust 10 may be extended to an initial file system component 20 (e.g., initial random access memory/RAM disk file/Initrd++), as well as to a trusted container platform 22. The illustrated initial file system component 20 includes a measurement agent that may measure (and in some cases verify, e.g., based on a cryptographic hash such as a Secure Hash Algorithm/SHA 256 hash) the integrity of the trusted container platform 22, which may include one or more container OS packages (e.g., namespace and/or control group/cgroup information), a container manager (e.g., container management daemon and/or engine such as, for example, a DOCKER daemon, a ROCKET daemon, etc.), a root of trust measurement agent (e.g., virtual root of trust for measurement/vRTM), and so forth. Accordingly, a trusted launch 24 may be conducted of the containerized application 12 without concern over vulnerability to attack (e.g., eliminating security bottlenecks associated with deployment in, for example, a cloud data center). One approach involves remotely verifying (and attesting to) the trust of this system through verification of the current system measurement against good-known measurements stored remotely.

Figure 2:
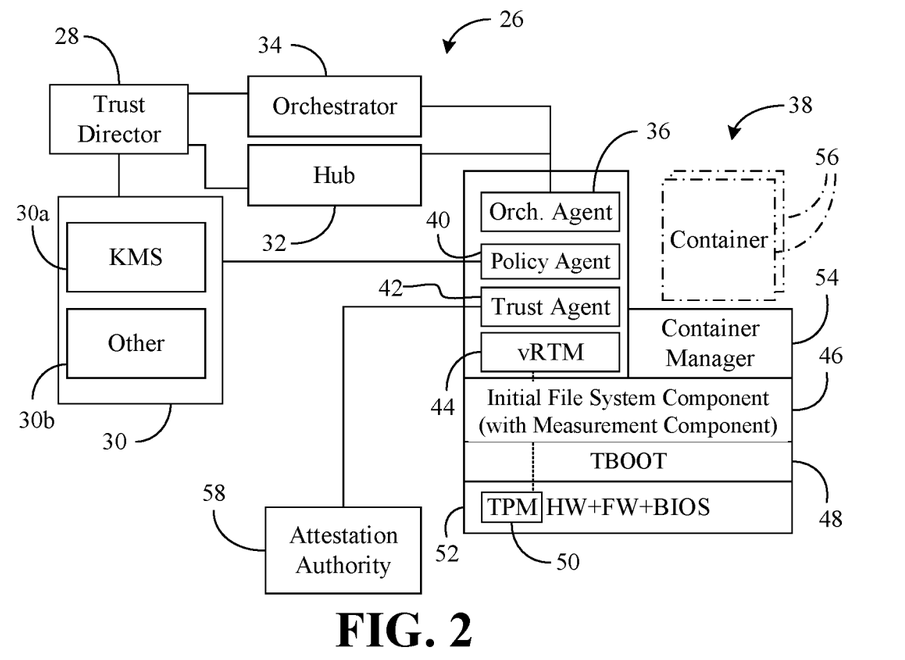
FIG. 2 is a block diagram of an example of a trusted launch architecture according to an embodiment.

FIG. 2 shows a trusted launch architecture 26 in which a trust director 28 (e.g., operating in a customer data center) communicates with a platform 30 (30a, 30b) containing a key management server (KMS) 30a and various other servers 30b in order to establish a level of confidentiality with respect to images of containerized applications (e.g., "container images"). The KMS 30a may provide, store and manage keys used to encrypt and decrypt the container images. The trust director 28 may send the container images, manifests (e.g., listings of files in the container images), and trust policies to a hub 32 (e.g., DOCKER hub). An application user can issue launch requests to an orchestrator 34 (e.g., cloud service provider/CSP portal), wherein the orchestrator 34 and/or the hub 32 may communicate with an orchestrator agent 36 in a security stack 38. The security stack 38 may also include a policy agent 40, a trust agent 42 and a virtual root of trust for measurement (vRTM, e.g., a root of trust measurement agent) 44.

The trust agent 42 may communicate with an attestation authority 58 in order to verify the identity of the trust director 28, the orchestrator 34 and/or the hub 32, and the policy agent 40 may communicate with the platform 30 in order to validate received trust policy information (e.g., using one or more keys). The illustrated vRTM 44 is trusted because it is part of the trust chain through an initial file system component 46 (e.g., Initrd++) and a trusted boot (TBOOT) layer 48 with a trusted platform module (TPM) 50 in a hardware (HW), firmware (FW) and BIOS layer 52. The TPM 50 may include registers (e.g., platform configuration registers/PCRs) that hold various measurements in a shielded manner in order to prevent spoofing. Accordingly, the trust agent 42 may use the measurements obtained from the TPM 50 to authenticate a container manager 54 as well as the vRTM 44 prior to the trusted launch of one or more application containers 56. The trusted vRTM 44 may then be used to measure, verify and attest to the containerized images when they are launched.

Figure 3A:
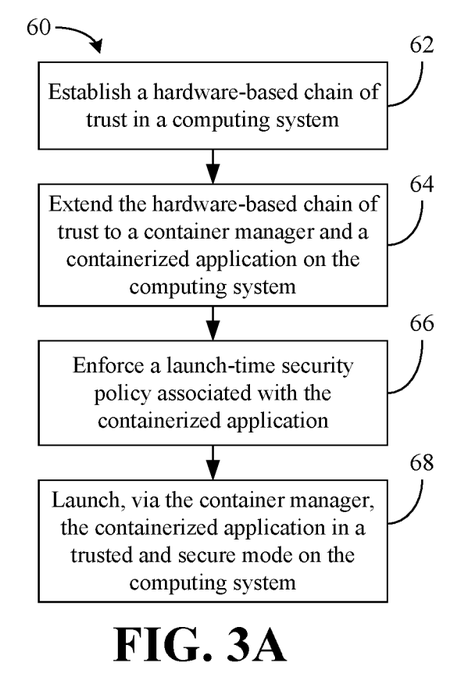
FIG. 3A is a flowchart of an example of a method of operating a security apparatus according to an embodiment.

FIG. 3A shows a method 60 of operating a security apparatus. The method 60 may generally be used to launch containers such as, for example, the containerized application 12 (FIG. 1) and/or the containers 56 (FIG. 2), already discussed. More particularly, the method 60 may be implemented as one or more modules in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

Illustrated processing block 62 provides for establishing a hardware-based chain of trust in a computing system. Block 62 may include, for example, verifying a signature of an authenticated code module (ACM). The hardware-based chain of trust may be extended at block 64 to a container manager and a containerized application on the computing system. Additionally, illustrated block 66 enforces a launch-time security policy associated with the containerized application. Block 66 may include, for example, limiting a launch-time capability of the containerized application, activating a security feature (e.g. Security-Enhanced LINUX/SELinux), placing the containerized application in a non-root state (e.g., removing system level privileges), limiting write access to the containerized application, and so forth. Block 68 may launch, via the container manager, the containerized application in a trusted and secure mode on the computing system. The trusted and secure mode may be achieved by enforcing trust and security during the launch of the containerized application. In one example, the containerized application is structured as a plurality of layers and block 68 further provides for decrypting a unified view that represents only a subset of the plurality of layers.

Figure 3B:
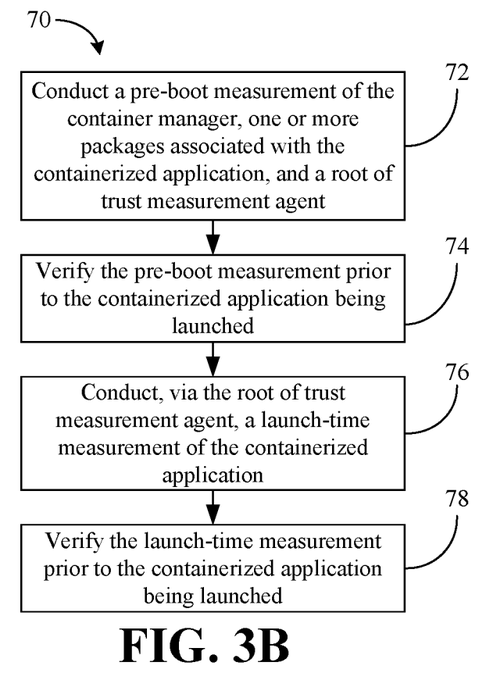
FIG. 3B is a flowchart of an example of a method of extending a hardware-based chain of trust to a container manager and a containerized application according to an embodiment.

FIG. 3B shows a method 70 of extending a hardware-based chain of trust to a container manager and a containerized application. The method 70, which may be readily substituted for block 64 (FIG. 3A), already discussed, may be implemented as one or more modules in a set of logic instructions stored in a non-transitory machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 72 conducts a pre-boot measurement of the container manager, one or more packages (e.g., namespaces, cgroups) associated with the containerized application, and a root of trust measurement agent. Block 74 may verify the pre-boot measurement prior to the containerized application being launched. Additionally, illustrated block 76 provides for conducting, via the root of trust measurement agent, a launch-time measurement of the containerized application, wherein the launch-time measurement may be verified at block 78 prior to the containerized application being launched.

Figure 4:
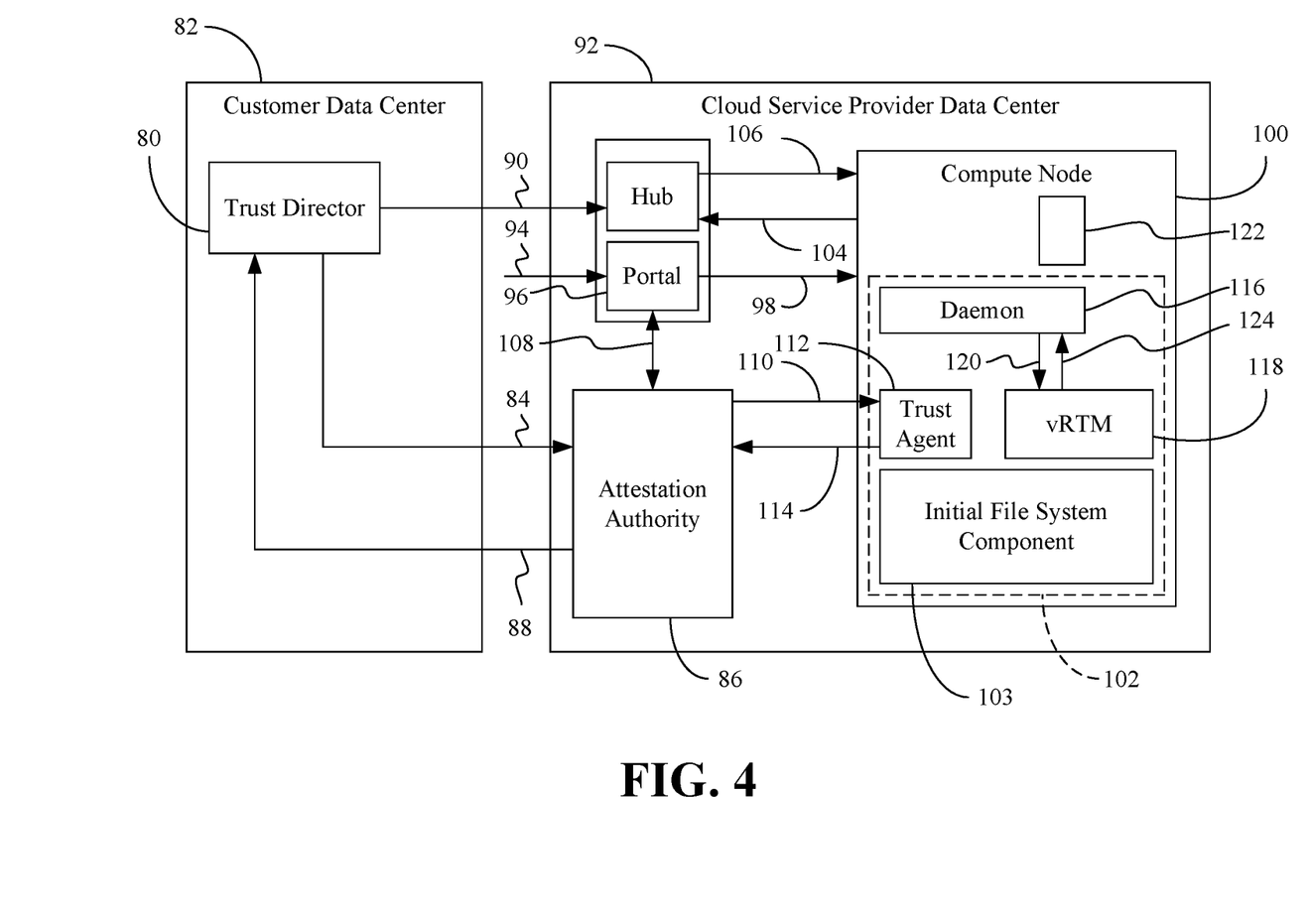
FIG. 4 is a block diagram of an example of a trusted launch sequence according to an embodiment.

Turning now to FIG. 4, a trusted launch sequence is shown in which a trust director 80 in a customer data center 82 sends a registration request 84 (e.g., image identifier/ID, hash) to an attestation authority 86 and receives a registration reply 88. The registration reply 88 might include, for example, a customer identifier, along with a digitally signed copy of the customer identifier and the information from the registration request 84 (e.g., Customer ID, {Customer ID, Image ID, Hash}$_{AUTHID}$). The illustrated trust director 80 then sends a storage request 90 to a hub 92, wherein the storage request 90 may include, for example, the container image, a manifest and a trust policy.

A launch initiation 94 (e.g., originating from any source and/or input device) may be detected by a portal 96, which may in turn trigger an interaction 108 with the attestation authority 86 that causes the attestation authority 86 to send a quote request 110 to a trust agent 112 operating within a trusted computing base (TCB) 102 of a compute node 100. The TCB 102 may also include an initial file system component 103 (e.g., Initrd++) having a measurement component that conducts a pre-boot measurement of a daemon 116 (e.g., container manager), a vRTM 118 (e.g., root of trust measurement agent), one or more packages (e.g., namespace, cgroups), and so forth. The trust agent 112 may verify the pre-boot measurement and send a quote reply 114 to the attestation authority 86, wherein the quote reply 114 may include a digitally signed assertion of one or more credentials (e.g., pre-boot measurements) maintained within the TCB 102.

Upon receipt of the quote reply 114, the attestation authority 86 may generate a trust report indicating the trustworthiness of the container platform that includes the daemon 116 and the vRTM 118. The illustrated portal 96 then sends a launch request 98 to the compute node 100, which may generate a retrieval request 104 in response to the launch request 98. The illustrated hub 92 generates a retrieval reply 106 based on the retrieval request 104, wherein the retrieval reply 106 may include the container image, the manifest and the trust policy. In one example, the trust policy contains the golden measurements (e.g., whitelist) for the containerized application image. The trust policy may also be signed by the attestation authority 86.

The daemon 116 may issue an authorization request 120 to the vRTM 118, wherein the vRTM 118 may conduct a launch-time measurement of the containerized application 122. Additionally, the trust agent 112 may verify the launch-time measurement prior to the containerized application 122 being launched. If the verification is successful, the illustrated vRTM 118 sends an authorization 124 to the daemon 116, wherein the authorization 124 enables the daemon 116 to conduct a trusted launch of the containerized application 122.

Figure 5A:
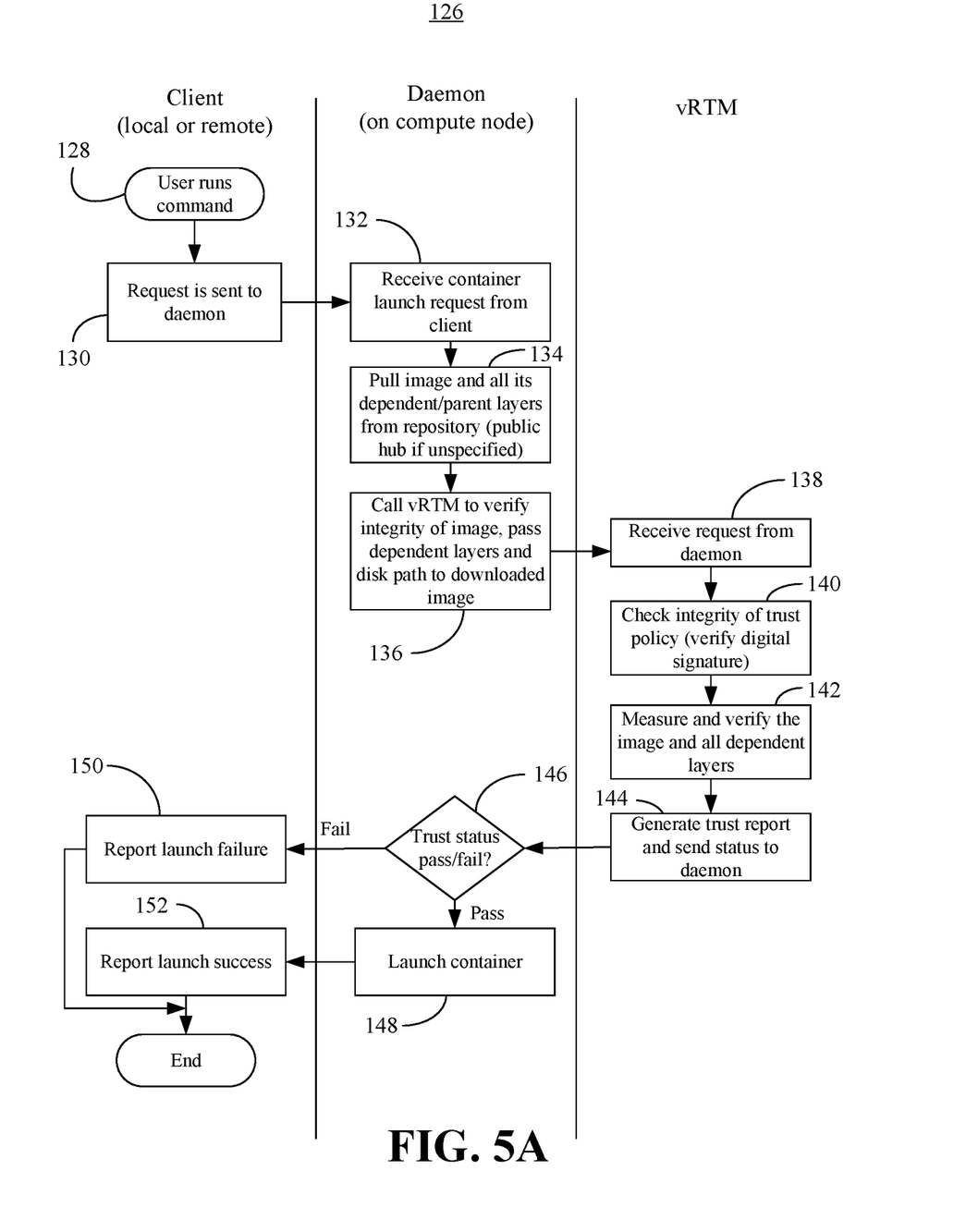
FIGS. 5A and 5B are flowcharts of examples of operating a client, a daemon and a virtual root of trust for measurement (vRTM) according to embodiments.

FIG. 5A shows a method 126 of operating a client, a daemon (e.g., container manager) and a vRTM (e.g., root of trust measurement agent) in order to conduct a trusted launch of a containerized application. The method 126 may be implemented as one or more modules in a set of logic instructions stored in a non-transitory machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated client block 128 provides for detecting the execution of a user command, wherein a container launch request may be sent to the daemon at client block 130 in response to the user command and container launch request is received at daemon block 132. An image of the containerized application may be retrieved at daemon block 134 from a repository, along with any dependent (e.g., child) and/or parent layers of the containerized application. In this regard, the containerized application may be structured as a plurality of layers, wherein one or more layers may include files that reference (e.g., are dependent on) one or more files of a different layer. For example, with reference to FIG. 1, an APACHE Patch v2 layer 12e might be a parent layer to an APACHE Patch v1 layer 12d, which may be a parent layer to a base APACHE layer 12c. Indeed, the base APACHE layer 12c may in turn be a parent layer to an UBUNTU 14.04 layer 12b, which is a parent layer to a base UBUNTO layer 12a, and so forth. The retrieval of the plurality of layers may be from a public hub if a particular repository is not specified.

Returning now to FIG. 5A, daemon block 136 may call the vRTM to verify the integrity of the image. Daemon block 136 may also pass the dependent layers and the disk path to the downloaded image files. Passing a subset of the layers (e.g., only the dependent/child layers) may enable the daemon block 136 to reduce encryption/decryption complexity and increase launch speed, particularly if the passed layers are decrypted from a unified view (e.g., using a union file system).

The request from the daemon may be received at vRTM block 138, wherein illustrated vRTM block 140 checks the integrity of the trust policy by, for example, using the public key of an attestation authority to verify a digital signature associated with the trust policy. Additionally, illustrated vRTM block 142 measures and (optionally) verifies the container image and all dependent layers of the container image against the whitelist/golden measurements contained in the trust policy. A trust report may be generated and sent to the daemon at vRTM block 144. If it is determined from the trust report at daemon block 146 that the trust status is "pass", illustrated daemon block 148 launches the container and client block 152 reports the launch success. Otherwise, client block 150 may report the launch failure. Alternatively, the vRTM may simply perform and store the measurement and leave the verification to be performed through a remote attestation mechanism similar to the one used for attesting to the trust of the platform.

Figure 5B:
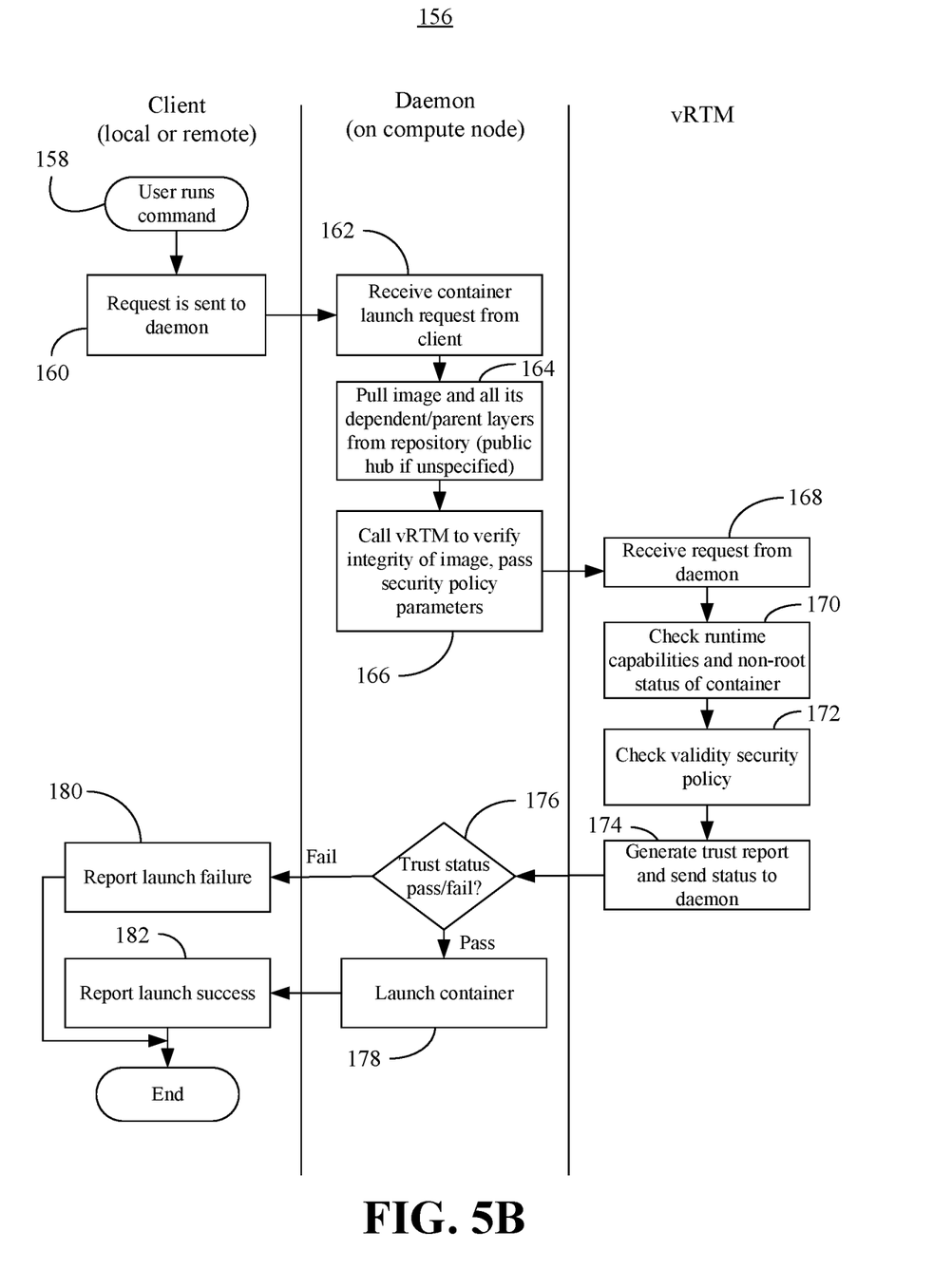

FIG. 5B shows a method 156 of operating a client, a daemon (e.g., container manager) and a vRTM (e.g., root of trust measurement agent) in order to enforce a launch-time security policy associated with a containerized application. The method 156 may be implemented as one or more modules in a set of logic instructions stored in a non-transitory machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated client block 158 provides for detecting the execution of a user command, wherein a container launch request may be sent to the daemon at client block 160 in response to the user command and container launch request is received at daemon block 162. An image of the containerized application may be retrieved at daemon block 164 from a repository, along with any dependent (e.g., child) and/or parent layers of the containerized application. Additionally, daemon block 166 may call the vRTM to verify the integrity of the image. Daemon block 166 may also pass security policy parameters.

The request from the daemon may be received at vRTM block 168, wherein illustrated vRTM block 170 checks the runtime capabilities and non-root status of the container. Additionally, illustrated vRTM block 172 checks the validity of the launch-time parameters contained in the security policy (e.g., detecting the possibility of the container being malicious based on the launch-time parameters). A trust report may be generated and sent to the daemon at vRTM block 174. If it is determined from the trust report at daemon block 176 that the trust status is "pass", illustrated daemon block 178 launches the container and client block 182 reports the launch success. Otherwise, client block 180 may report the launch failure.

Figure 6:
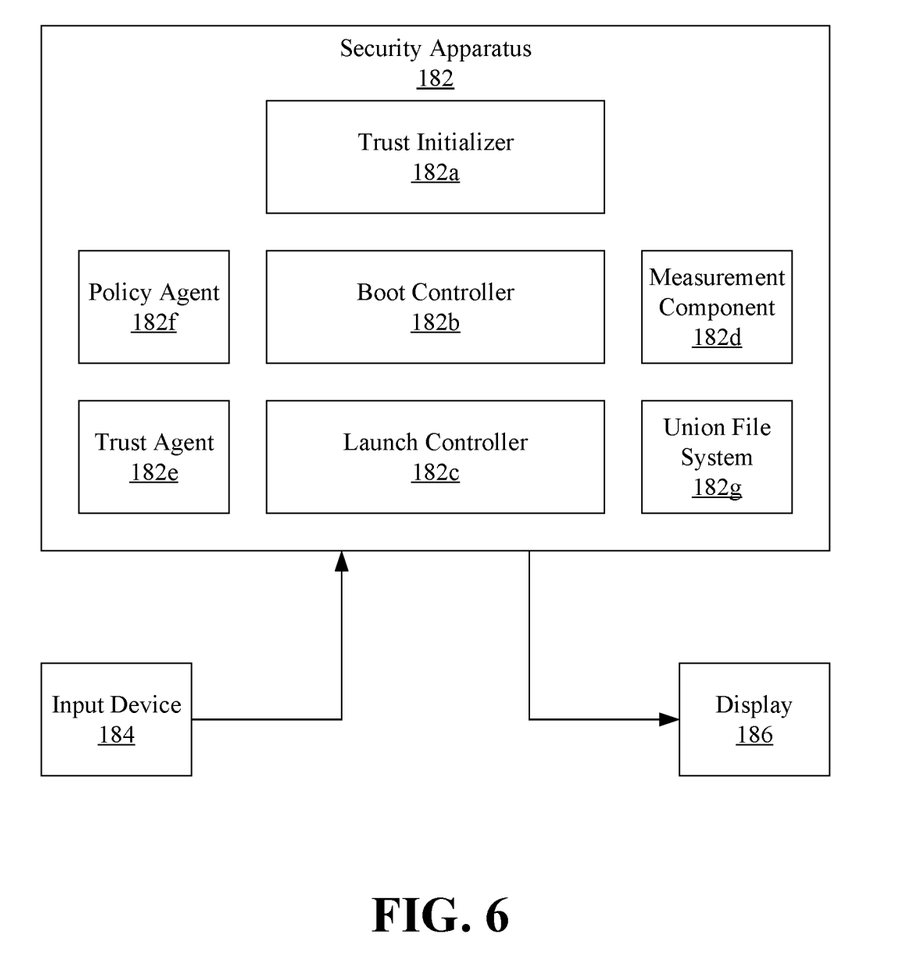
FIG. 6 is a block diagram of an example of a security apparatus according to an embodiment.

Turning now to FIG. 6, a security apparatus 182 (182a-182g, components communicatively coupled to one another) is shown. The security apparatus, which may include logic instructions, configurable logic, fixed-functionality logic hardware, etc., or any combination thereof, may generally implement one or more aspects of the method 60 (FIG. 3A), the method 70 (FIG. 3B), the method 126 (FIG. 5A) and/or the method 156 (FIG. 5B), already discussed. Moreover, the security apparatus 182 may be implemented in an architecture such as, for example, the trusted launch architecture 26 (FIG. 2) and/or the TCB 102 (FIG. 4), already discussed. In the illustrated example, an input device 184 (e.g., network controller, user interface/UI device) receives a request to launch a containerized application on a computing system such as a cloud data center.

The security apparatus 182 may include a trust initializer 182a to establish a hardware-based chain of trust in the computing system. A boot controller 182b may be communicatively coupled to the trust initializer 182a, wherein the boot controller 182b is configured to extend the hardware-based chain of trust to a container manager and the containerized application on the computing system. Moreover, the security apparatus 182 may also include a launch controller 182c communicatively coupled to the boot controller 182b. The launch controller 182c may launch, via the container manager, the containerized application on the computing system. A display 186 (e.g., organic light emitting diode/OLED, liquid crystal display/LCD, touchscreen) may visually present data associated with the containerized application.

The illustrated security apparatus 182 also includes a measurement component 182d to conduct a pre-boot measurement of the container manager, one or more packages associated with the containerized application, and a root of trust measurement agent. In addition, a trust agent 182e (e.g., including a vRTM) may verify the pre-boot measurement prior to the containerized application being launched. In one example, the measurement component 182d conducts, via the root of trust measurement agent, a launch-time measurement of the containerized application, wherein the trust agent 182e verifies the launch-time measurement prior to the containerized application being launched.

The security apparatus 182 may also include a policy agent 182f to enforce a launch-time security policy associated with the containerized application. For example, the policy agent 182f might limit a launch-time capability of the containerized application, activate a security feature associated with the containerized application, place the containerized application in a non-root state, limit write access to the containerized application, etc., or any combination thereof. As already noted, the containerized application may be structured as a plurality of layers. In such a case, the security apparatus 182 may include a union file system 182g to decrypt a unified view that represents only a subset of the plurality of layers.

Figure 7:
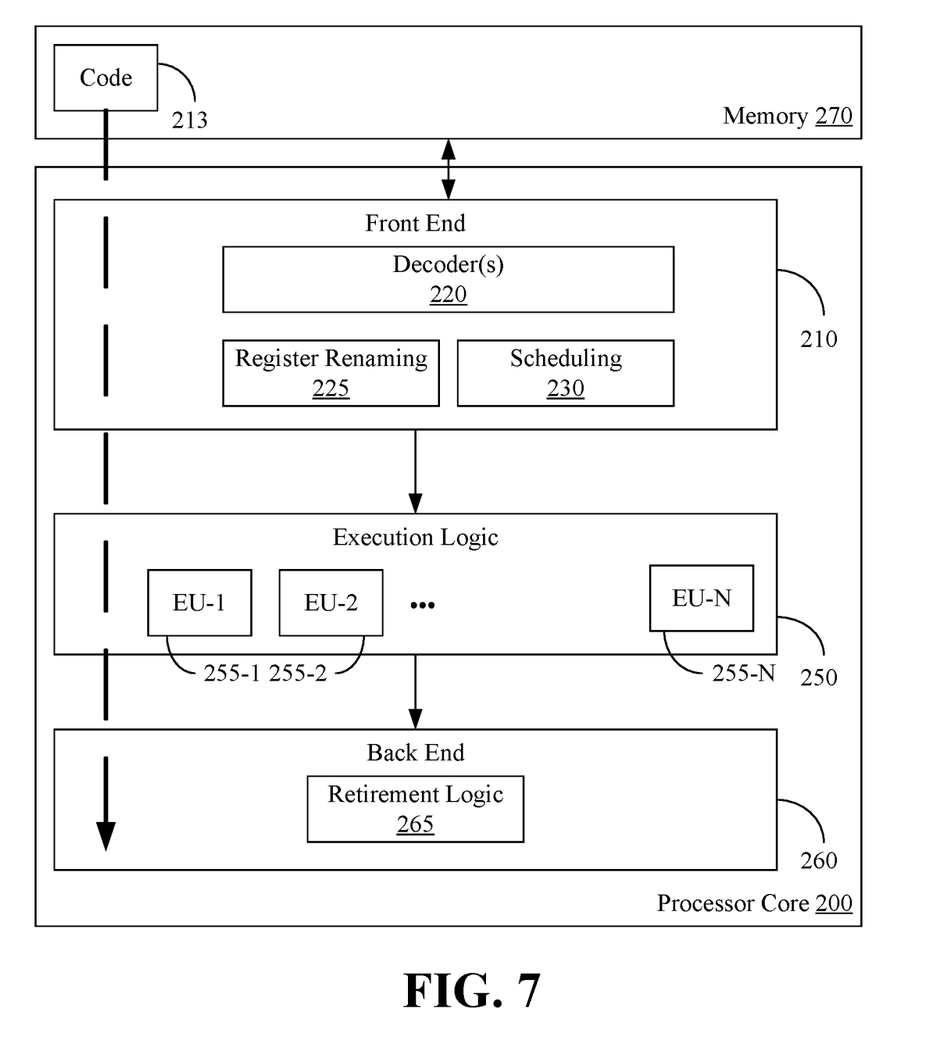
FIG. 7 is a block diagram of an example of a processor according to an embodiment.

FIG. 7 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 7, a processing element may alternatively include more than one of the processor core 200 illustrated in FIG. 7. The processor core 200 may be a single-threaded core or, for at least one embodiment, the processor core 200 may be multithreaded in that it may include more than one hardware thread context (or "logical processor") per core.

FIG. 7 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the method 60 (FIG. 3A), the method 70 (FIG. 3B), the method 126 (FIG. 5A) and/or the method 156 (FIG. 5B), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 7, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 8:
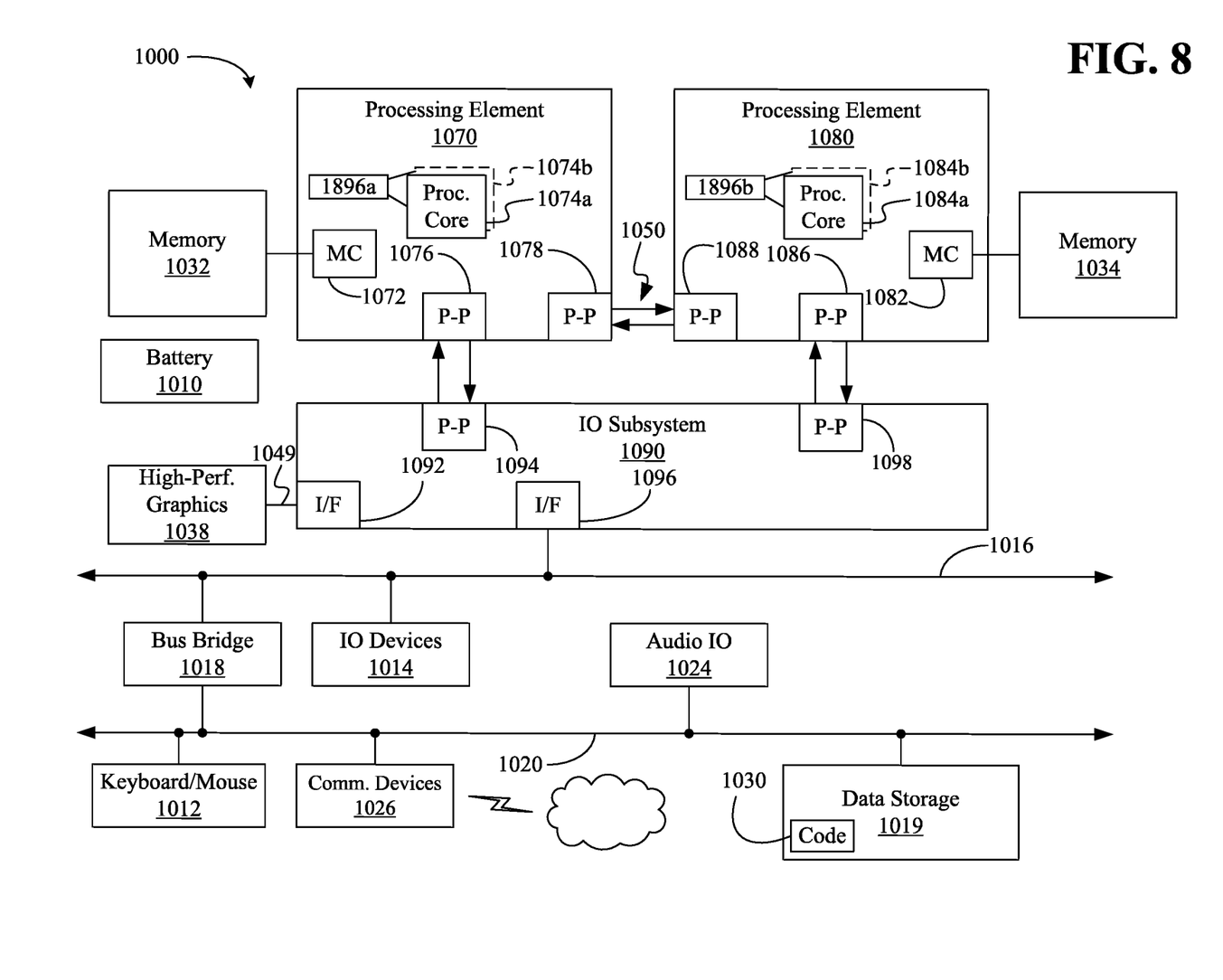
FIG. 8 is a block diagram of an example of a computing system according to an embodiment.

Referring now to FIG. 8, shown is a block diagram of a computing system 1000 embodiment in accordance with an embodiment. Shown in FIG. 8 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 8 may be implemented as a multi-drop bus rather than point-to-point interconnect.

As shown in FIG. 8, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 7.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 8, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 8, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 8, various I/O devices 1014 (e.g., speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the method 60 (FIG. 3A), the method 70 (FIG. 3B), the method 126 (FIG. 5A) and/or the method 156 (FIG. 5B), already discussed. Further, an audio I/O 1024 may be coupled to second bus 1020 and a battery 1010 may supply power to the computing system 1000.

Note that other embodiments are contemplated. For example, instead of the point-to-point architecture of FIG. 8, a system may implement a multi-drop bus or another such communication topology. Also, the elements of FIG. 8 may alternatively be partitioned using more or fewer integrated chips than shown in FIG. 8.

Additional Notes and Examples

Example 1 may include a security-enhanced computing system comprising an input device to receive a request to launch a containerized application on the computing system, a security apparatus including a trust initializer to establish a hardware-based chain of trust in the computing system, a boot controller communicatively coupled to the trust initializer, the boot controller to extend the hardware-based chain of trust to a container manager and the containerized application on the computing system, and a launch controller communicatively coupled to the boot controller, the launch controller to launch, via the container manager, the containerized application in a trusted and secure mode on the computing system, and a display to visually present data associated with the containerized application.

Example 2 may include the computing system of Example 1, wherein the security apparatus further includes a measurement component to conduct a pre-boot measurement of the container manager, one or more packages associated with the containerized application, and a root-of-trust measurement agent, and a trust agent to verify the pre-boot measurement prior to the containerized application being launched.

Example 3 may include the computing system of Example 2, wherein the measurement component is to conduct, via the root-of-trust measurement agent, a launch-time measurement of the containerized application, and the trust agent is to verify the launch-time measurement prior to the containerized application being launched.

Example 4 may include the computing system of Example 1, wherein the security apparatus further includes a policy agent to enforce a launch-time security policy associated with the containerized application.

Example 5 may include the computing system of Example 4, wherein the policy agent is to one or more of limit a launch-time capability of the containerized application, activate a security feature associated with the containerized application, place the containerized application in a non-root state, or limit write access to the containerized application.

Example 6 may include the computing system of any one of Examples 1 to 5, wherein the containerized application is to be structured as a plurality of layers, the security apparatus further including a union file system to decrypt a unified view that represents only a subset of the plurality of layers.

Example 7 may include a security apparatus comprising a trust initializer to establish a hardware-based chain of trust in a computing system, a boot controller communicatively coupled to the trust initializer, the boot controller to extend the hardware-based chain of trust to a container manager and a containerized application on the computing system, and a launch controller communicatively coupled to the boot controller, the launch controller to launch, via the container manager, the containerized application in a trusted and secure mode on the computing system.

Example 8 may include the apparatus of Example 7, further including a measurement component to conduct a pre-boot measurement of the container manager, one or more packages associated with the containerized application, and a root-of-trust measurement agent, and a trust agent to verify the pre-boot measurement prior to the containerized application being launched.

Example 9 may include the apparatus of Example 8, wherein the measurement component is to conduct, via the root-of-trust measurement agent, a launch-time measurement of the containerized application, and the trust agent is to verify the launch-time measurement prior to the containerized application being launched.

Example 10 may include the apparatus of Example 7, further including a policy agent to enforce a launch-time security policy associated with the containerized application.

Example 11 may include the apparatus of Example 10, wherein the policy agent is to one or more of limit a launch-time capability of the containerized application, activate a security feature associated with the containerized application, place the containerized application in a non-root state, or limit write access to the containerized application.

Example 12 may include the apparatus of any one of Examples 7 to 11, wherein the containerized application is to be structured as a plurality of layers, the apparatus further including a union file system to decrypt a unified view that represents only a subset of the plurality of layers.

Example 13 may include a method of operating a security apparatus, comprising establishing a hardware-based chain of trust in a computing system, extending the hardware-based chain of trust to a container manager and a containerized application on the computing system, and launching, via the container manager, the containerized application in a trusted and secure mode on the computing system.

Example 14 may include the method of Example 13, wherein extending the hardware-based chain-of-trust to the container manager and the containerized application includes conducting a pre-boot measurement of the container manager, one or more packages associated with the containerized application, and a root-of-trust measurement agent, and verifying the pre-boot measurement prior to the containerized application being launched.

Example 15 may include the method of Example 14, further including conducting, via the root-of-trust measurement agent, a launch-time measurement of the containerized application, and verifying the launch-time measurement prior to the containerized application being launched.

Example 16 may include the method of Example 13, further including enforcing a launch-time security policy associated with the containerized application.

Example 17 may include the method of Example 16, wherein enforcing the launch-time security policy includes one or more of limiting a launch-time capability of the containerized application, activating a security feature associated with the containerized application, placing the containerized application in a non-root state, or limiting write access to the containerized application.

Example 18 may include the method of any one of Examples 13 to 17, wherein the containerized application is structured as a plurality of layers, the method further including decrypting a unified view that represents only a subset of the plurality of layers.

Example 19 may include at least one computer readable storage medium comprising a set of instructions, which when executed by a computing system, cause the computing system to establish a hardware-based chain of trust in a computing system, extend the hardware-based chain of trust to a container manager and a containerized application on the computing system, and launch, via the container manager, the containerized application in a trusted and secure mode on the computing system.

Example 20 may include the at least one computer readable storage medium of Example 19, wherein the instructions, when executed, cause the computing system to conduct a pre-boot measurement of the container manager, one or more packages associated with the containerized application, and a root-of-trust measurement agent, and verify the pre-boot measurement prior to the containerized application being launched.

Example 21 may include the at least one computer readable storage medium of Example 20, wherein the instructions, when executed, cause the computing system to conduct, via the root-of-trust measurement agent, a launch-time measurement of the containerized application, and verify the launch-time measurement prior to the containerized application being launched.

Example 22 may include the at least one computer readable storage medium of Example 19, wherein the instructions, when executed, cause the computing system to enforce a launch-time security policy associated with the containerized application.

Example 23 may include the at least one computer readable storage medium of Example 22, wherein the instructions, when executed, cause the computing system to one or more of limit a launch-time capability of the containerized application, activate a security feature associated with the containerized application, place the containerized application in a non-root state, or limit write access to the containerized application.

Example 24 may include the at least one computer readable storage medium of any one of Examples 19 to 23, wherein the containerized application is to be structured as a plurality of layers, and wherein the instructions, when executed, cause the computing system to decrypt a unified view that represents only a subset of the plurality of layers.

Example 25 may include a security apparatus comprising means for establishing a hardware-based chain-of-trust in a computing system, means for extending the hardware-based chain-of-trust to a container manager and a containerized application on the computing system, and means for launching, via the container manager, the containerized application in a trusted and secure mode on the computing system.

Example 26 may include the apparatus of Example 25, wherein the means for extending the hardware-based chain-of-trust to the container manager and the containerized application includes means for conducting a pre-boot measurement of the container manager, one or more packages associated with the containerized application, and a root-of-trust measurement agent, and means for verifying the pre-boot measurement prior to the containerized application being launched.

Example 27 may include the apparatus of Example 26, further including means for conducting, via the root-of-trust measurement agent, a launch-time measurement of the containerized application, and means for verifying the launch-time measurement prior to the containerized application being launched.

Example 28 may include the apparatus of Example 25, further including means for enforcing a launch-time security policy associated with the containerized application.

Example 29 may include the apparatus of Example 28, wherein the means for enforcing the launch-time security policy includes one or more of means for limiting a launch-time capability of the containerized application, means for activating a security feature associated with the containerized application, means for placing the containerized application in a non-root state, or means for limiting write access to the containerized application.

Example 30 may include the apparatus of any one of Examples 25 to 29, wherein the containerized application is to be structured as a plurality of layers, the apparatus further including means for decrypting a unified view that represents only a subset of the plurality of layers.

Thus, techniques described herein may enable cloud data center providers to assure users/customers that containers are launched on a trusted platform and containerized applications have not been tampered with. Additionally, techniques may protect against pre-boot compromises of container compute and management engine platforms. Container managers (e.g. DOCKER or ROCKET engine/daemons) may be protected in a chain of trust that is in turn protected by server hardware. Hardware-based launch integrity of container management engines may also be achieved. Techniques may also protect against the compromise and manipulation of containerized application images in cloud data centers (e.g., via container confidentiality and container image measurement and encryption). Techniques may also provide the ability to check and enforce options in a trusted manner during container launch to improve runtime security of other containers (e.g., limiting privileges of possibly malicious application containers). Techniques may also provide the ability to store secrets in containerized images in the cloud without significant performance penalty, while keeping container launch overhead relatively small (e.g., due to lower decryption overhead).

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A, B, C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system comprising:
    an input device to receive a request to launch a containerized application on the computing system;
    a security apparatus including,
        a trust initializer to establish a hardware-based chain-of-trust in the computing system,
        a boot controller communicatively coupled to the trust initializer, the boot controller to extend the hardware-based chain-of-trust to a container manager and the containerized application on the computing system,
        a launch controller communicatively coupled to the boot controller, the launch controller to launch, via the container manager, the containerized application in a trusted and secure mode on the computing system, and
        a measurement component to conduct a pre-boot measurement of the container manager, one or more packages associated with the containerized application, and a root-of-trust measurement agent, and
        a trust agent to verify the pre-boot measurement prior to the containerized application being launched; and
    a display to visually present data associated with the containerized application;
    wherein the containerized application is part of a container image that includes a manifest and a trust policy, wherein the manifest includes a list of application files in the container image, wherein the trust policy includes measurements for the application files in the container image, and wherein the trust policy is signed with a digital signature for verifying the integrity of the trust policy, and
    wherein the measurement component is to conduct, via the root-of-trust measurement agent, a launch-time measurement of the containerized application, and the trust agent is to verify the launch-time measurement prior to the containerized application being launched.

2. The computing system of claim 1, wherein a public key of an attestation authority is to be used to verify the digital signature associated with the trust policy.

3. The computing system of claim 1, wherein the security apparatus further includes a policy agent to enforce a launch-time security policy associated with the containerized application.

4. The computing system of claim 3, wherein the policy agent is to one or more of limit a launch-time capability of the containerized application, activate a security feature associated with the containerized application, place the containerized application in a non-root state, or limit write access to the containerized application.

5. The computing system of claim 1, wherein the containerized application is to be structured as a plurality of layers, the security apparatus further including a union file system to decrypt a unified view that represents only a subset of the plurality of layers.

6. An apparatus comprising logic implemented at least partly in one or more of configurable hardware logic or fixed-functionality hardware logic, the logic including:
    a trust initializer to establish a hardware-based chain-of-trust in a computing system;
    a boot controller communicatively coupled to the trust initializer, the boot controller to extend the hardware-based chain-of-trust to a container manager and a containerized application on the computing system;
    a launch controller communicatively coupled to the boot controller, the launch controller to launch, via the container manager, the containerized application in a trusted and secure mode on the computing system; and
    a measurement component to conduct a pre-boot measurement of the container manager, one or more packages associated with the containerized application, and a root-of-trust measurement agent; and
    a trust agent to verify the pre-boot measurement prior to the containerized application being launched;
    wherein the containerized application is part of a container image that includes a manifest and a trust policy, wherein the manifest includes a list of application files in the container image, wherein the trust policy includes measurements for the application files in the container image, and wherein the trust policy is signed with a digital signature for verifying the integrity of the trust policy, and wherein the measurement component is to conduct, via the root-of-trust measurement agent, a launch-time measurement of the containerized application, and the trust agent is to verify the launch-time measurement prior to the containerized application being launched.

7. The apparatus of claim 6, wherein a public key of an attestation authority is to be used to verify the digital signature associated with the trust policy.

8. The apparatus of claim 6, the logic further including a policy agent to enforce a launch-time security policy associated with the containerized application.

9. The apparatus of claim 8, wherein the policy agent is to one or more of limit a launch-time capability of the containerized application, activate a security feature associated with the containerized application, place the containerized application in a non-root state, or limit write access to the containerized application.

10. The apparatus of claim 6, wherein the containerized application is to be structured as a plurality of layers, the apparatus further including a union file system to decrypt a unified view that represents only a subset of the plurality of layers.

11. A method comprising:
establishing a hardware-based chain-of-trust in a computing system;
extending the hardware-based chain-of-trust to a container manager and a containerized application on the computing system, wherein extending the hardware-based chain-of-trust to the container manager and the containerized application includes:
conducting a pre-boot measurement of the container manager, one or more packages associated with the containerized application, and a root-of-trust measurement agent; and
verifying the pre-boot measurement prior to the containerized application being launched;
launching, via the container manager, the containerized application in a trusted and secure mode on the computing system;
conducting, via the root-of-trust measurement agent, a launch-time measurement of the containerized application; and
verifying the launch-time measurement prior to the containerized application being launched;
wherein the containerized application is part of a container image that includes a manifest and a trust policy, wherein the manifest includes a list of application files in the container image, wherein the trust policy includes measurements for the application files in the container image, and wherein the trust policy is signed with a digital signature for verifying the integrity of the trust policy.

12. The method of claim 11, wherein a public key of an attestation authority is used to verify the digital signature associated with the trust policy.

13. The method of claim 11, further including enforcing a launch-time security policy associated with the containerized application.

14. The method of claim 13, wherein enforcing the launch-time security policy includes one or more of:
limiting a launch-time capability of the containerized application;
activating a security feature associated with the containerized application;
placing the containerized application in a non-root state; or
limiting write access to the containerized application.

15. The method of claim 11, wherein the containerized application is structured as a plurality of layers, the method further including decrypting a unified view that represents only a subset of the plurality of layers.

16. At least one computer readable non-transitory storage medium comprising a set of instructions, which when executed by a computing system, cause the computing system to:
establish a hardware-based chain-of-trust in a computing system;
extend the hardware-based chain-of-trust to a container manager and a containerized application on the computing system;
launch, via the container manager, the containerized application in a trusted and secure mode on the computing system;
conduct a pre-boot measurement of the container manager, one or more packages associated with the containerized application, and a root-of-trust measurement agent;
verify the pre-boot measurement prior to the containerized application being launched;
conduct, via the root-of-trust measurement agent, a launch-time measurement of the containerized application; and
verify the launch-time measurement prior to the containerized application being launched;
wherein the containerized application is part of a container image that includes a manifest and a trust policy, wherein the manifest includes a list of application files in the container image, wherein the trust policy includes measurements for the application files in the container image, and wherein the trust policy is signed with a digital signature for verifying the integrity of the trust policy.

17. The at least one computer readable non-transitory storage medium of claim 16, wherein a public key of an attestation authority is used to verify the digital signature associated with the trust policy.

18. The at least one computer readable non-transitory storage medium of claim 16, wherein the instructions, when executed, cause the computing system to enforce a launch-time security policy associated with the containerized application.

19. The at least one computer readable non-transitory storage medium of claim 18, wherein the instructions, when executed, cause the computing system to one or more of:
limit a launch-time capability of the containerized application;
activate a security feature associated with the containerized application;
place the containerized application in a non-root state; or
limit write access to the containerized application.

20. The at least one computer readable non-transitory storage medium of claim 16, wherein the containerized application is to be structured as a plurality of layers, and wherein the instructions, when executed, cause the computing system to decrypt a unified view that represents only a subset of the plurality of layers.

* * * * *